Dec. 21, 1926. 1,611,186
C. HABART
REAMER
Filed Nov. 13, 1922
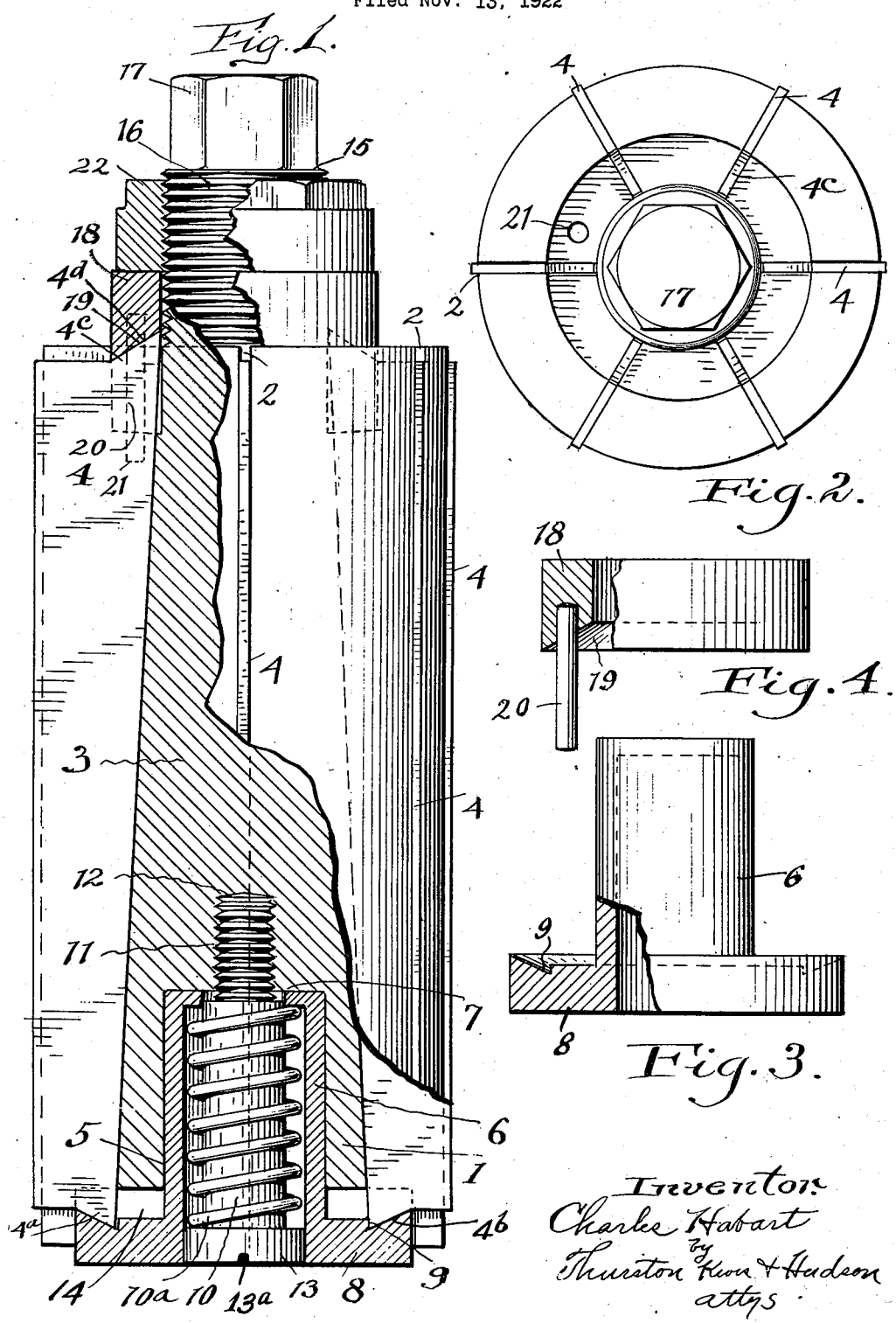

Patented Dec. 21, 1926.

1,611,186

UNITED STATES PATENT OFFICE.

CHARLES HABART, OF CLEVELAND, OHIO.

REAMER.

Application filed November 13, 1922. Serial No. 600,614.

The present invention relates to metal cutting tools in which the cutting elements of the tool are adjustable, and the invention particularly relates to a reamer in which the blades are adjustable, and in which the blades are supported practically throughout their entire length so that there could be no movement or chattering of the blades, and furthermore, the invention contemplates an adjustment for the blades whereby the effective cutting diameter of the blades may be varied, and the adjustment necessary for increasing or diminishing the effective cutting diameter can be made from one end of the reamer.

Reference should be had to the accompanying drawings forming a part of this specification, in which Fig. 1 is an elevation with portions in section of a reamer embodying my invention; Fig. 2 is an end elevation of the reamer; Fig. 3 is an elevation with a portion in section of one of the reamer parts, and Fig. 4 is an elevation with portions in section of another part of the reamer.

Referring to the drawings, the body of the reamer 1 is preferably formed from a solid piece of metal, in which there are a plurality of slots 2 milled or otherwise cut. These slots extend longitudinally, and are of a width sufficient to receive a reamer cutting blade to provide a snug fit. The base 3 of each of the grooves 2 is made slanting with respect to the axis of the reamer body, and the bases of all the slots for the reamer blades slant in the same direction, which is toward that end of the reamer which is connected with the means by which the reamer is caused to turn.

In each of the grooves 2 there is a reamer blade such as indicated at 4, and the lower edge of the reamer blade is formed at an angle with respect to its cutting edge, the angle at the bottom of each reamer blade being complementary to the angle of slant or incline of the base 3 of each slot, so that when a reamer blade is inserted in one of the slots of the body one movement of the blade in a longitudinal direction will cause all portions of the cutting blade to move radially with respect to the axis of the body portion 1.

It will be understood from the drawing that there are a plurality of cutting blades used in connection with the reamer body, and these are preferably equally spaced with respect to the surface of the outer cylindrical surface of the body 1.

Inasmuch as all of the reamer blades are constructed alike and operate in the same manner as that previously described, it will be apparent that when all of the reamer blades are moved in one direction they will slide up on the bases of the grooves in which they are located, causing the blades to move beyond the outer cylindrical surface of the body 1, and the projection of each of these blades beyond such surface will be the same. Movement of these blades in the opposite direction will cause them to recede into the grooves in which they are placed, and bring the outer cutting edges nearer to the cylindrical surface of the body member 1. Thus by moving the blades in one direction or the other the effective cutting diameter of the blades may be varied. Each of the blades 4 is at one end provided with an extension 4$^a$ which has a slanting surface 4$^b$ and each blade at its opposite end is provided with an extension 4$^c$ that has a slanting edge 4$^d$.

The reamer body at the end of the blades having the projection 4$^a$ is provided with a recess 5 which receives a hollow barrel 6. This barrel at one end has an opening 7, the purpose of which will be later described.

At the outer end of the barrel member 6 is a head 8 which on its inner side and adjacent the periphery has a slanting surface 9 that is complementary to the slanting surface 4$^b$ of the cutting blades, and is adapted to engage with these cutting blades to hold them in position as well as to cause their movement, as will be subsequently described.

Within the barrel member 1 there is a pin 10 which is of a diameter substantially the same as that of the opening 7 in the barrel 6, and the end of this pin will normally engage in the opening 7. The pin 10 has an extension 11 which is threaded, and occupies a threaded opening 12 formed in the body portion of the reamer. The pin 10 at its outer end has a head 13 and upon its outer surface there are provisions for receiving a turning tool, such for instance, as a spanner wrench, and an opening for accommodating one prong of a spanner wrench is indicated at 13$^a$ of the drawing.

The diameter of this head 13 is the same as the interior diameter of the barrel member 6, so that upon any relative movement between the barrel member 6 and the pin 10, the barrel 6 will have a supporting and centering bearing upon the head 13 and upon the end of the pin 10 which extends into the opening 7. Moreover, of course, upon any movement of the barrel 6 it also has a bearing in the recess 5 in the body portion 1. Therefore, it will be seen that assuming the parts to be made with the proper fit there will be no sidewise or loose movement of the barrel 5 and its motion will be confined to a straight line movement.

It should be noted that the axis of the pin 10 as well as the axis of the barrel 6 are at the center line or axis of the body member 1 of the reamer body.

The end of the body portion 1 has a recess at the end thereof into which the head 8 extends, this recess extending a sufficient depth so as to expose the projecting ends 4$^a$ of the reamer blades and to permit engagement of these projections 4$^a$ by the head 8 in the manner which has been described.

At the opposite end of the reamer the reamer body is recessed to form a chamber 14, and the lower portions of each of the reamer blades extend into this chamber.

Preferably formed integral with the reamer body is an extending shank 15 which is threaded, as indicated at 16, and at its outer end is here shown as provided with a head 17.

It will, of course, be obvious that the shank may be extended to any desired length, and may be formed in any fashion suitable to adapt it for use in any type of a machine which will effect rotation of the reamer. In the present instance the nut 17 is formed to receive a turning implement of any character, as will later be described.

Mounted upon the shank 15 but capable of sliding thereon is a collar 18. The inner end of this collar is provided with a slanting surface 19 which is complementary to the slanting surface 4$^b$ at the ends of the reamer blades, and the surface 19 is adapted to engage with the surface 4$^b$ to move the reamer blades in the manner to be later described. This collar 18 has a pin 20 affixed thereto, and the pin is adapted to extend into an opening 21 which is formed in the reamer body. This pin prevents rotation of the collar 18 with respect to the reamer body, but permits sliding movement of the collar upon the shank 15. Beyond the collar 18 and threaded upon the shank 15 is a retaining member 22 which may be screwed up against the collar 18 in order to cause it to move longitudinally upon the shank.

As before explained, the spring 10$^a$ will normally hold the barrel member 6 and the head 8 in their innermost position, and the constant tendency of this spring is to return the barrel to its innermost position, and by virtue of the fact that the head 8 engages with the outer ends of the cutting blades 4, the tendency of the head member 8 will be to push the blades 4 in a direction toward the opposite end of the body of the reamer, or in other words, the constant tendency of the spring 10 and the head 8 is to push the blades in a direction to cause them to reduce the effective cutting diameter of the blades.

When the member 22 is turned upon the threads 15 and pushes the collar 18 inwardly the collar pushes the blades 4 against the head 8 and against the retaining action of the spring 10$^a$. The movement of the blades under action of the member 22, is to expand the reamer, or in other words, to push the blades outwardly. The movement of the blades will be only that which is necessarily imparted due to the rotation of the member 22, due to the fact that the spring 10$^a$ exerting pressure through the head 8 will not permit the blades to move further than that which they are actually forced to move under the turning action of the member 22. Therefore, the blades will be absolutely retained at both ends of each blade, and due to the engagement between the opposite ends of each blade with the head 8 and the collar 18 respectively, there can be no up and down movement independent of the movement of the head 8 and the collar 18 so that the blades are held against chattering and maintain their adjusted position.

If it be desired to decrease the effective cutting diameter of the reamer blades when in expanded condition, the member 22 may be turned in a direction to move it outward along the shank 15, and this will permit the spring 10$^a$, acting through the head 8, to push the reamer blades toward the collar 18, which movement causes them to retract and move deeper into the slots in the body of the reamer blade.

It will be noted that the adjustment of the reamer blades is made from one end of the reamer entirely, and this is an important consideration in many classes of work, because it enables a readjustment of the reamer blades without the necessity of removing the reamer from the work upon which it is operating.

For instance, the reaming of cylinders for internal combustion engines or in work of similar character, the reamer may be lowered into the cylinder and the blades adjusted to take a preliminary cut, and after the reamer has been rotated so as to have taken such a preliminary cut, the reamer blades may be adjusted outwardly to the desired extent so as to take a second cut without removing the reamer from the cylinder.

In the matter of reboring cylinders whereas the reference indicates the cylinders have been previously bored but have become more or less out of true because of usage, the reamer of the present invention may be placed in the cylinder, with the blades in retracted position, and then the blades adjusted outwardly to take a preliminary cut and subsequently adjusted to take an additional cut or cuts until the cylinder has been reamed to the extent necessary to make it again a true cylindrical surface, and all of this may be accomplished without removing the reamer from the cylinder.

As before stated, the reamer may be rotated in any desired manner, that is to say, the shank 15 may be so fashioned as to be capable of attachment to any power-driven rotating shaft, or as in the case of regrinding cylinders the cylinder may be rotated by putting a crank lever of any suitable construction upon the end of the shank 15 and rotating the reamer by hand.

Having described my invention, I claim:—

1. A reamer comprising a body member having a radial slot formed therein which opens on the periphery of the body and extends longitudinally thereof, said slot having a bottom surface inclined with respect to the axis of the reamer body, a reamer blade mounted in said slot and adapted to be moved longitudinally thereof, and means for holding the blade against the bottom of the slot and for shifting the same longitudinally thereof comprising a spring pressed member engaging one end of said blade and tending to move said blade along the slot in a direction to cause the blade to move inwardly toward the axis of the body and an adjustable member associated with the reamer body and engaging the other end of the reamer blade for moving the blade against the action of the spring pressed member to cause the blade to be shifted outwardly from the axis of the body.

2. A reamer comprising a body having a plurality of radial slots which open upon the periphery of the body and extend toward one end thereof, the bottom surface of each slot slanting with respect to the axis of the body outwardly toward the said end of the body, a reamer blade in each of said slots, a spring-pressed member adjacent the said end of the reamer body which member engages with one end of each of the blades, and normally urges the blades toward the deeper end of the slot, an adjusting member associated with the body and engaging the other end of each of the blades and movable to push the blades in the opposite direction to that in which they are urged by the spring-pressed member.

3. A reamer having a body portion and provided with a plurality of radial slots which open upon the periphery, the bottom of the slots extending at an angle with respect to the axis of the body, a plurality of blades one in each slot, a head having a hollow stem portion which is mounted in an opening in the end of the reamer body and slidable therein, a pin having an abutment at one end thereof extending through said hollow stem and secured in the reamer body, a spring surrounding said pin and located within said hollow sleeve one end of said spring abutting against the abutment on the pin and at the other end abutting against the base of said hollow sleeve, the said head engaging with one end of each of said blades and normally urging the blades in one direction through the slots, an adjustable member mounted upon the body portion and engaging the opposite end of each of said blades and capable of moving said blades against the action of the said spring.

4. A reamer having a body portion and provided with a plurality of radial slots which open upon the periphery, the bottom of the slots extending at an angle with respect to the axis of the body, a plurality of blades one in each slot, a head having a hollow stem portion which is mounted in an opening in the end of the reamer body and slidable therein, a pin having an abutment at one end thereof extending through said hollow stem and secured in the reamer body, a spring surrounding said pin and located within said hollow sleeve one end of said spring abutting against the abutment on the pin and at the other end abutting against the base of the said hollow sleeve, the said head engaging with one end of each of said blades and normally urging the blades in one direction through the slots, said body portion being provided with a shank, a movable member mounted upon said shank and capable of sliding thereon, means for preventing rotation of said member said member engaging with the adjacent ends of the reamer blades, a second movable member mounted upon the said shank and adapted when moved to engage the first movable member and push the blades in the slots against the action of the head located at the opposite end thereof.

5. A reamer comprising a body portion and having a plurality of radial slots the bottom of each slot extending at an angle with respect to the axis of the body, a plurality of reamer blades there being a reamer blade in each slot, each of said reamer blades being provided with a projection at each end thereof which projections are provided with slanting surfaces said body portion at one end thereof having an axial recess, a hollow sleeve member mounted in said recess, a head member carried by said sleeve said head member being provided with a slanting groove adjacent its periphery, the said grooved portion of the head being adapted to engage with the slanting surfaces on the projections at one end of the blades, a pin extending through said hollow sleeve and secured in the reamer body, an abutment carried by said pin, a spring surrounding the pin and within the said sleeve portion one end of the said spring engaging with the abutment on the pin and at its opposite end engaging with the end of the sleeve whereby the head is normally urged toward the body of the reamer the said reamer body having an extending threaded shank at the end thereof opposite that at which the head is mounted, a movable member mounted upon said shank and capable of sliding thereon, means for preventing rotation of the said movable member upon the shank, said movable member being provided with a groove having a slanting surface which is adapted to engage with the slanting surface upon the projections on the blades adjacent thereto, a nut member mounted upon the said threaded shank and movable to engage with the said movable member to move the blades through the slots.

In testimony whereof, I hereunto affix my signature.

CHARLES HABART.